(12) United States Patent
Bittner et al.

(10) Patent No.: US 11,117,146 B2
(45) Date of Patent: Sep. 14, 2021

(54) SPRAY SYSTEM FOR AN AGRICULTURAL MACHINE

(71) Applicant: CNH Industrial America LLC, New Holland, PA (US)

(72) Inventors: Roy A. Bittner, Cato, WI (US); Steven Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 252 days.

(21) Appl. No.: 16/359,395

(22) Filed: Mar. 20, 2019

(65) Prior Publication Data

US 2020/0298260 A1    Sep. 24, 2020

(51) Int. Cl.
| | |
|---|---|
| *B05B 9/03* | (2006.01) |
| *B05B 9/00* | (2006.01) |
| *A01M 7/00* | (2006.01) |
| *B05B 1/20* | (2006.01) |
| *A01C 23/04* | (2006.01) |
| *A01C 23/00* | (2006.01) |
| *B05B 15/50* | (2018.01) |

(52) U.S. Cl.
CPC ............ *B05B 9/035* (2013.01); *A01C 23/007* (2013.01); *A01C 23/008* (2013.01); *A01C 23/047* (2013.01); *A01M 7/005* (2013.01); *A01M 7/0042* (2013.01); *A01M 7/0085* (2013.01); *A01M 7/0089* (2013.01); *B05B 9/007* (2013.01); *B05B 1/20* (2013.01); *B05B 15/50* (2018.02)

(58) Field of Classification Search
CPC ... A01C 23/007; A01C 23/008; A01C 23/047; A01M 7/0042; A01M 7/005; A01M 7/0085; A01M 7/0089; B05B 1/20; B05B 1/30; B05B 9/007; B05B 9/035; B05B 15/50
See application file for complete search history.

(56) References Cited

U.S. PATENT DOCUMENTS

| | | | |
|---|---|---|---|
| 2,614,885 A | 10/1952 | Roell et al. | |
| 5,234,165 A | 8/1993 | Rhyne, Jr. | |
| 5,704,546 A * | 1/1998 | Henderson | .......... A01M 7/0089 239/1 |

(Continued)

FOREIGN PATENT DOCUMENTS

EP    0086029    8/1983

*Primary Examiner* — Darren W Gorman
(74) *Attorney, Agent, or Firm* — Rebecca L. Henkel; Rickard K. DeMille

(57) ABSTRACT

A spray system for an agricultural machine is configured to include a valving arrangement and multiple liquid product lines coupled to spray nozzle assemblies such that the valving arrangement can connect the product lines to the spray nozzle assemblies in different ways to achieve different modes of operation. Such modes can include providing agricultural liquid product flow through the spray nozzle assemblies at differing rates and/or flushing the product through the spray nozzle assemblies in differing directions. This can be achieved by controlling the valving arrangement to selectively connect any of the lines to pump for supplying product, to tank for returning product, or to block the lines to inhibit the flow of product. In one aspect, the product multiple lines can be of different sizes to enable more modes of operation, such as greater or lesser flow rates while spraying.

19 Claims, 7 Drawing Sheets

(56) References Cited

U.S. PATENT DOCUMENTS

| | | | |
|---|---|---|---|
| 6,126,088 A * | 10/2000 | Wilger | A01M 7/0089 239/159 |
| 6,189,807 B1 | 2/2001 | Miller et al. | |
| 6,250,564 B1 * | 6/2001 | Chahley | B05B 1/3013 239/170 |
| 6,341,760 B1 | 1/2002 | Rawlings | |
| 7,140,555 B1 | 11/2006 | Bricko et al. | |
| 8,800,887 B2 | 8/2014 | Moeller et al. | |
| 9,061,296 B2 | 6/2015 | Peterson | |
| 2013/0320105 A1 | 12/2013 | Schmidt | |
| 2014/0252111 A1 | 9/2014 | Michael et al. | |
| 2016/0243573 A1 | 8/2016 | McGuffie | |
| 2016/0296875 A1 | 10/2016 | Zeeb | |
| 2017/0006852 A1 * | 1/2017 | Engelbrecht | A01M 7/0042 |
| 2017/0072420 A1 | 3/2017 | Meyer | |
| 2017/0079200 A1 | 3/2017 | Posselius et al. | |
| 2017/0144180 A1 | 5/2017 | Trask | |

* cited by examiner

SPRAY SYSTEM FOR AN AGRICULTURAL MACHINE

FIELD OF THE INVENTION

The invention relates generally to agricultural machines, such as self-propelled sprayers and, in particular, to a spray system for an agricultural machine configured to include a valving arrangement and multiple liquid product lines coupled to spray nozzle assemblies such that the valving arrangement can connect the product lines to the spray nozzle assemblies in various ways to achieve various modes or states of operation.

BACKGROUND OF THE INVENTION

Agricultural machines, such as self-propelled sprayers, are getting larger to increase operating efficiency, such as by covering more area in a single pass of a spraying session. Spray systems, including sprayer product circuits, are typically structured to function efficiently within a specific liquid product flow range through the nozzles. Too slow of a flow rate can allow undesirable solids to precipitate out. However, too fast of a flow rate can cause pressure drops which result in uneven application of liquid product down the length of the boom. This may be complicated by the fact that many applications in a field can be outside of the typical range. Also, new products require may more extensive cleaning, and the product circuits may have dead-end spots that can be difficult to clean. These dead-end spots can also trap air which can cause control problems. A need therefore exists for an improved spray system that eliminates one or more of the foregoing disadvantages.

SUMMARY OF THE INVENTION

A spray system for an agricultural machine is configured to include a valving arrangement and multiple liquid product lines coupled to spray nozzle assemblies such that the valving arrangement can connect the product lines to the spray nozzle assemblies in different ways to achieve different modes of operation. Such Triodes can include providing agricultural liquid product flow through the spray nozzle assemblies at differing rates and/or flushing the product through the spray nozzle assemblies in differing directions. This can be achieved by controlling the valving arrangement to selectively connect any of the lines to pump for supplying product, to tank for returning product, or to block the lines to inhibit the flow of product. In one aspect, the product multiple lines can be of different sizes to enable more modes of operation, such as greater or lesser flow rates while spraying.

Accordingly, each nozzle body assembly can be constructed with an additional port on the supply side of a diaphragm check. Each port can be connected to a common line that mimics a main supply line. Both lines can be plumbed to valves that can block the line or connect the line to either a pump or tank. The two lines may be of different sizes. Accordingly, by connecting one line to the pump and the other line to tank, a spray boom containing multiple nozzles can be flushed, nozzle bodies and all. Reverse flushing is also possible. Blocking the larger line and feeding the nozzles with the smaller line can provide proper flow speeds for low rates. Swapping the supply to the larger line can provide proper flow speeds for medium rates. Pressurizing both lines can provide proper flow speeds for high rates.

By flushing through the nozzles, a majority of blind spots can be eliminated. Flushing is more complete, and air can also be removed. In another aspect, the supply line can be attached to the bodies like the original or be remote mounted. The second supply port can be at the end of the body assembly, or on the side of the last body in the stack to support existing end options.

In one aspect, a second port is added to each nozzle assembly in order to add a second product line. Each line is plumbed such that either can be routed to tank or to pressure. If one is to tank, flushing can occur through the bodies. If flow to tank is blocked, spraying flow can be routed through a small line, a larger line, or both.

Specifically, then, one aspect of the invention can include a spray system for an agricultural machine, including: a nozzle system for spraying a liquid product; first and second product lines coupled to the nozzle system; and a valving arrangement coupled to the first and second product lines, in which the valving arrangement is configured to selectively connect each of the first and second product lines to supply liquid product to the nozzle system in a first state, in which the valving arrangement is configured to selectively connect one of the first and second product lines to supply liquid product to the nozzle system while blocking the other of the first and second product lines to inhibit flow of liquid product in a second state, and in which the valving arrangement is configured to selectively connect one of the first and second product lines to supply liquid product to the nozzle system while connecting the other of the first and second product lines to return liquid product from the nozzle system in a third state.

Another aspect of the invention can include: a spray system for an agricultural machine, including: a nozzle system for spraying a liquid product; first and second product lines coupled to the nozzle system; a valving arrangement coupled to the first and second product lines; and an electronic control system in communication with the valving arrangement, the electronic control system including a processor executing a program stored in a non-transient medium to control the valving arrangement to selectively switch between multiple states, including: a first state in which the valving arrangement is configured to selectively connect each of the first and second product lines to supply, liquid product to the nozzle system; a second state in which the valving arrangement is configured to selectively connect one of the first and second product lines to supply liquid product to the nozzle system while blocking the other of the first and second product lines to inhibit flow of liquid product; and a third state in which the valving arrangement is configured to selectively connect one of the first and second product lines to supply liquid product to the nozzle system while connecting the other of the first and second product lines to return liquid product from the nozzle system.

Another aspect of the invention can include: a self-propelled agricultural vehicle, including: a chassis supporting a cab and having multiple wheels for moving the vehicle; a liquid product application system supported by the chassis, the agricultural product application system including multiple nozzle assemblies, each nozzle assembly for spraying an agricultural product; first and second product lines coupled to each nozzle assembly; a valving arrangement coupled to the first and second product lines; and an electronic control system in communication with the valving arrangement, the electronic control system including a processor executing a program stored in a non-transient medium to control the valving arrangement to selectively switch between a plurality of states, including: a first state in which the valving arrangement is configured to selectively connect each of the first and second product lines to supply liquid product to each nozzle assembly; a second state in which the valving arrangement is configured to selectively connect one of the first and second product lines to supply liquid product to each nozzle assembly while blocking the other of the first and second product lines to inhibit flow of liquid product; and a third state in which the valving arrangement is configured to selectively connect one of the first and second product lines to supply liquid product to each nozzle assembly while connecting the other of the first and second product lines to return liquid product from each nozzle assembly.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
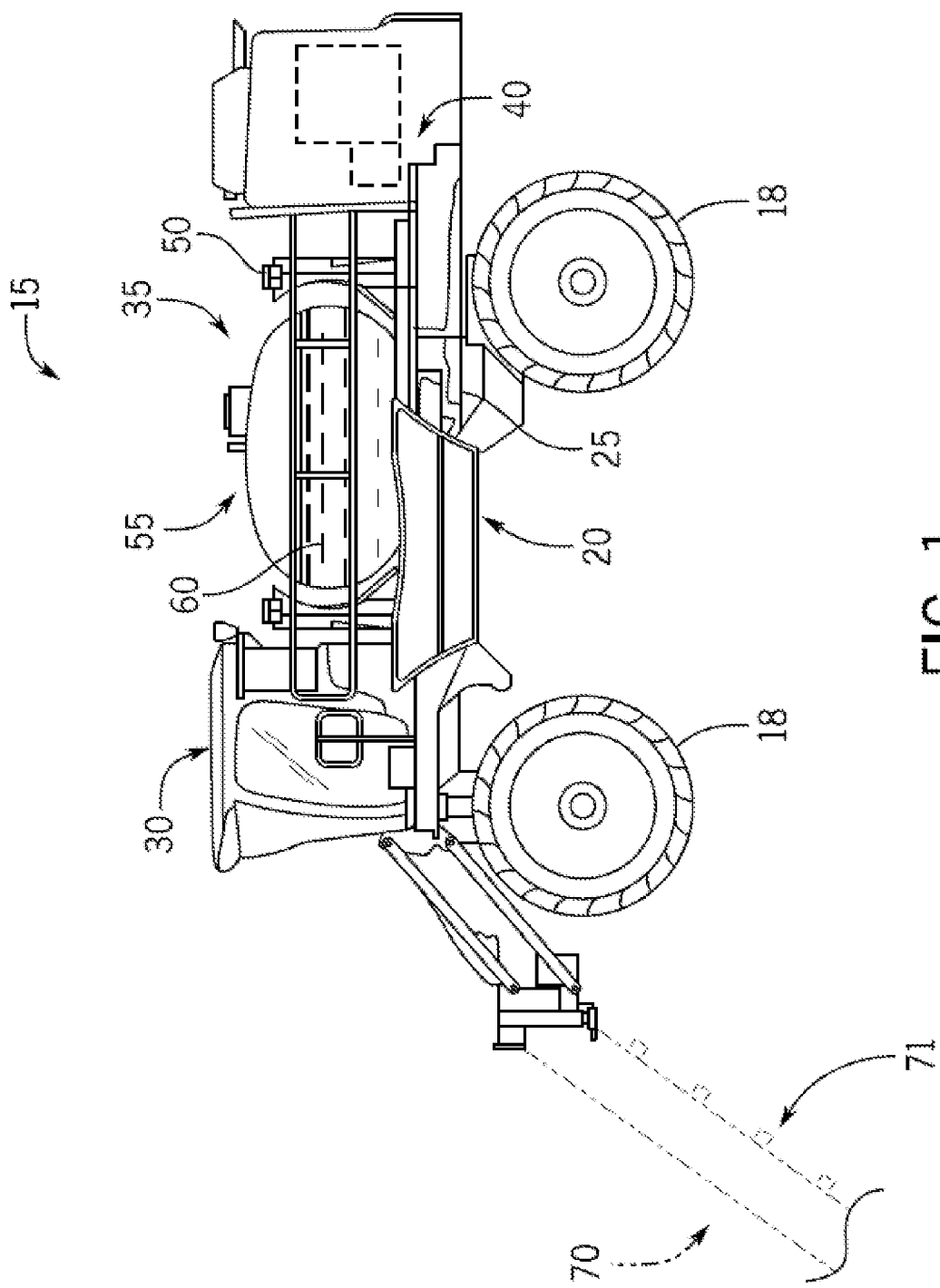
FIG. 1 is a side elevation view of self-propelled off-road agricultural vehicle with a spray system in accordance with an aspect of the invention.

Referring now to the drawings and specifically to FIG. 1, a spray system for achieving different modes of operation, explained in greater detail elsewhere herein, is shown for use with an exemplar self-propelled off-road agricultural vehicle. The self-propelled off-road agricultural vehicle is shown here by way of example as a self-propelled sprayer 15. The sprayer 15 is shown as a front-mounted boom self-propelled sprayer such as those available from CNH Industrial, including the Miller Nitro and the New Holland Guardian Series front-mounted boom sprayers. Although the sprayer 15 is shown as a front-mounted boom self-propelled sprayer, it is understood that self-propelled versions of the sprayer 15 can have either front-mounted, mid-mount, or rear-mounted booms, as well as boom-less sprayers, tiered booms, and detachable sprayers.

Still referring to FIG. 1, sprayer 15 includes wheels 18 supporting a chassis 20 having chassis frame 25 that supports various assemblies, systems, and components. These various assemblies, systems, and components include a cab 30, and an application system shown as spray system 35, and a hydrostatic drivetrain system 40. Spray system 35 includes storage containers such as a rinse tank 50 storing water or a rinsing solution and a product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump 36 conveys product 60 from product tank 55 through plumbing components such as interconnected pieces of tubing and through a foldable and height-adjustable boom of a boom system 70 for release out of spray nozzle assemblies 71 that are spaced from each other along the width of the boom during spraying operations of sprayer 15.

Figure 2:
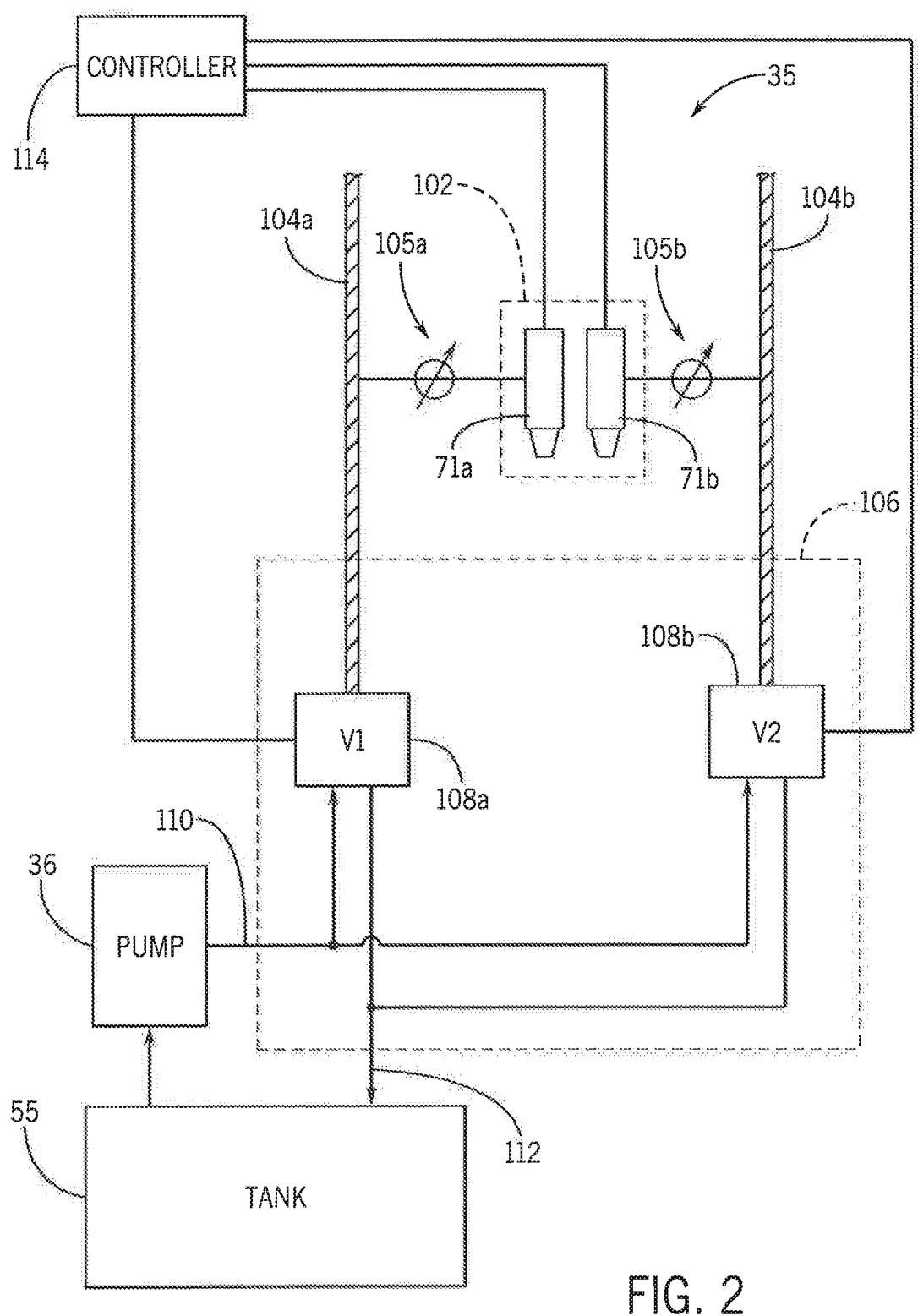
FIG. 2 is a diagram of the spray system which can be implemented by the vehicle of FIG. 1.

Referring now to FIG. 2, a diagram of the spray system 35 which can be implemented by the sprayer 15 is shown in accordance with an aspect of the invention. The spray system 35 can include one or more spray nozzle assemblies 71 arranged in nozzle systems 102, such as first and second spray nozzle assemblies 71*a* and 71*b*, respectively, in a nozzle system 102, for spraying a liquid product. Each spray nozzle assembly 71 can be constructed with first and second ports 80*a* and 80*b*, respectively, on opposing sides of a diaphragm check. First and second product lines 104*a* and 104*b*, respectively, for transporting liquid product, can be coupled to each nozzle system 102 via the ports 80. First and second flow meters 105*a* and 105*b*, for measuring liquid product flow in the control system, can be arranged between the first and second product lines 104*a* and 104*b*, respectively, and the nozzle system 102.

A valving arrangement 106 can be coupled to first ends of the first and second product lines 104*a* and 104*b*, respectively. Second ends of the first and second product lines 104*a* and 104*b*, respectively, can be capped. The valving arrangement 106 can be configured between the first and second product lines 104*a* and 104*b*, respectively, the pump 36 and the tank 55. In one aspect, in the valving arrangement 106, a first electronically controlled multi-way valve 108*a*, such as a three-way, valve, can control flow between the first product line 104*a*, the pump 36, and the tank 55. Similarly, a second electronically controlled multi-way valve 108*b*, such as another three-way valve, can control flow between the second product line 104*b*, the pump 36, and the tank 55. Accordingly, the pump 36 can connect to each multi-way valve 108 in a pump line 110. Similarly, the tank 55 can connect to each multi-way valve 108 in a tank line 112. Moreover, in other configurations, the valving arrangement 106 can control connectivity between the first and second product lines 104*a* and 104*b*, respectively, and other tanks, such as the rinse tank 50. Such variations are within the scope of the invention.

An electronic control system 114, including a processor executing a program stored in a non-transient medium, in communication with the valving arrangement 106 can control the valving arrangement 106 to selectively switch between multiple states or modes of operation. In particular, to achieve various modes, each multi-way valve 108 can be electronically controlled by the control system 114 to selectively: connect a given product line 104 to the pump 36 for supplying product from the pump in the product line 104 under pressure to the nozzle system 102; connect a product line 104 to the tank 55 for returning product in the product line 104 from the nozzle system 102 to the tank 55; or close the multi-way valve 108 to block the product line 104 from the pump 36 and the tank 55 to inhibit the flow of product to or from the nozzle system 102.

Figure 3:
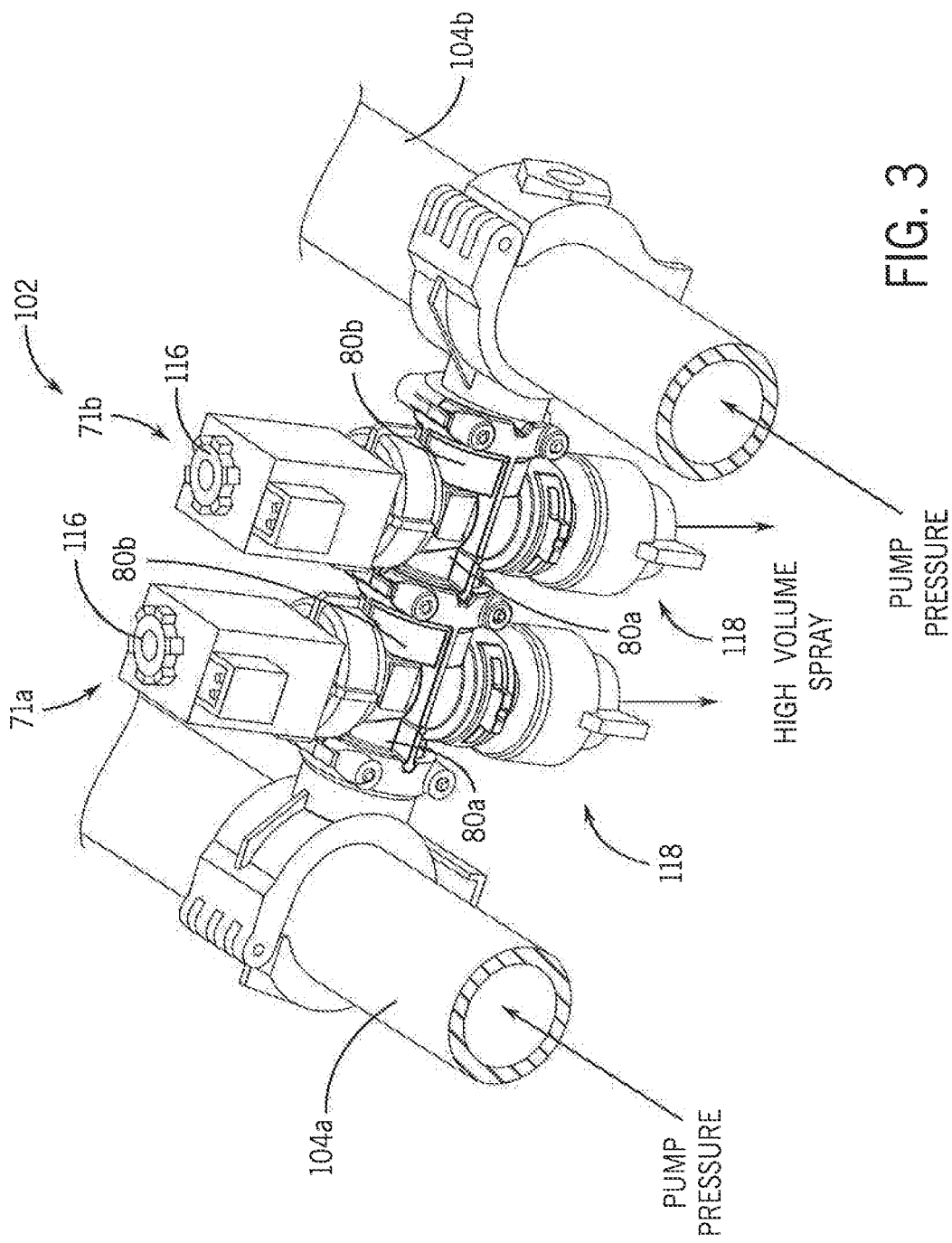
FIG. 3 is an isometric view of product lines coupled to nozzle assemblies to implement a first mode of operation providing high volume spray in accordance with an aspect of the invention.

With additional reference to FIG. 3, in a first mode of operation providing high volume spray, the control system 114 can control the valving arrangement 106 to connect each of the first and second product lines 104a and 104b, respectively, to the pump 36 and the pump line 110 supply liquid product to the nozzle system 102. In addition, the control system 114 can control each nozzle assembly 71 in the nozzle system 102 to spray. The control system 114 can control each nozzle assembly 71 to spray by controlling a solenoid 116 to open an orifice 118 of the nozzle assembly 71. By pumping liquid product to both product lines 104 under pressure, the nozzle assemblies 71 can produce a high-volume spray.

Figure 4:
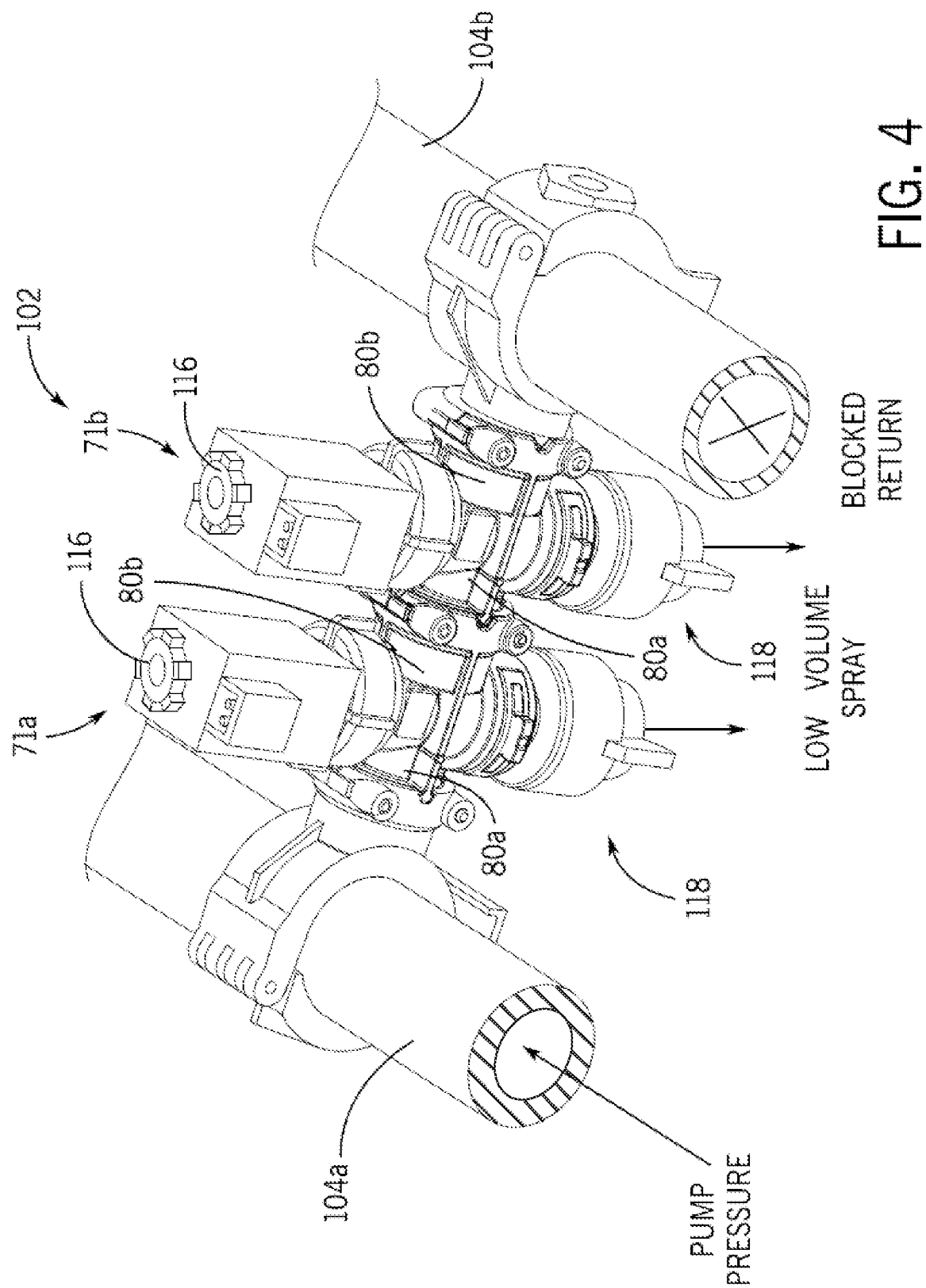
FIG. 4 is an isometric view of the product lines coupled to nozzle assemblies of FIG. 3, implementing a second mode of operation providing low volume spray, in accordance with an aspect of the invention.

With additional reference to FIG. 4, in a second mode of operation providing low volume spray, the control system 114 can control the valving arrangement 106 to connect the first product lines 104a to the pump 36 and the pump line 110 to supply liquid product to the nozzle system 102 while blocking the second product lines 104b to inhibit flow of liquid product. In addition, the control system 114 can control each nozzle assembly 71 in the nozzle system 102 to spray. By pumping liquid product to only the first product line 104a under pressure, while blocking the second product line 104b, the nozzle assemblies 71 can produce a low-volume spray.

In addition, the first and second product lines 104a and 104b, respectively, can be of different sizes (e.g., as shown in FIG. 4). For example, the first product line 104a could be no more than ½" in diameter, and the second product line 104b could be at least 1" in diameter. This can allow differing flow rates in differing modes when one product line 104 is supplying product while the other product line 104 is blocked. With the aforementioned exemplar dimensions, supplying product through the first product line 104a while blocking the second product line 10413 could result in a slightly lower flow rate, while supplying product through the second product line 104b while blocking the first product line 104a could result in a slightly higher flow rate. In addition, a restrictor or choke can be installed in either of the product lines 104 to fine tune such flow rates as desired.

Figure 5:
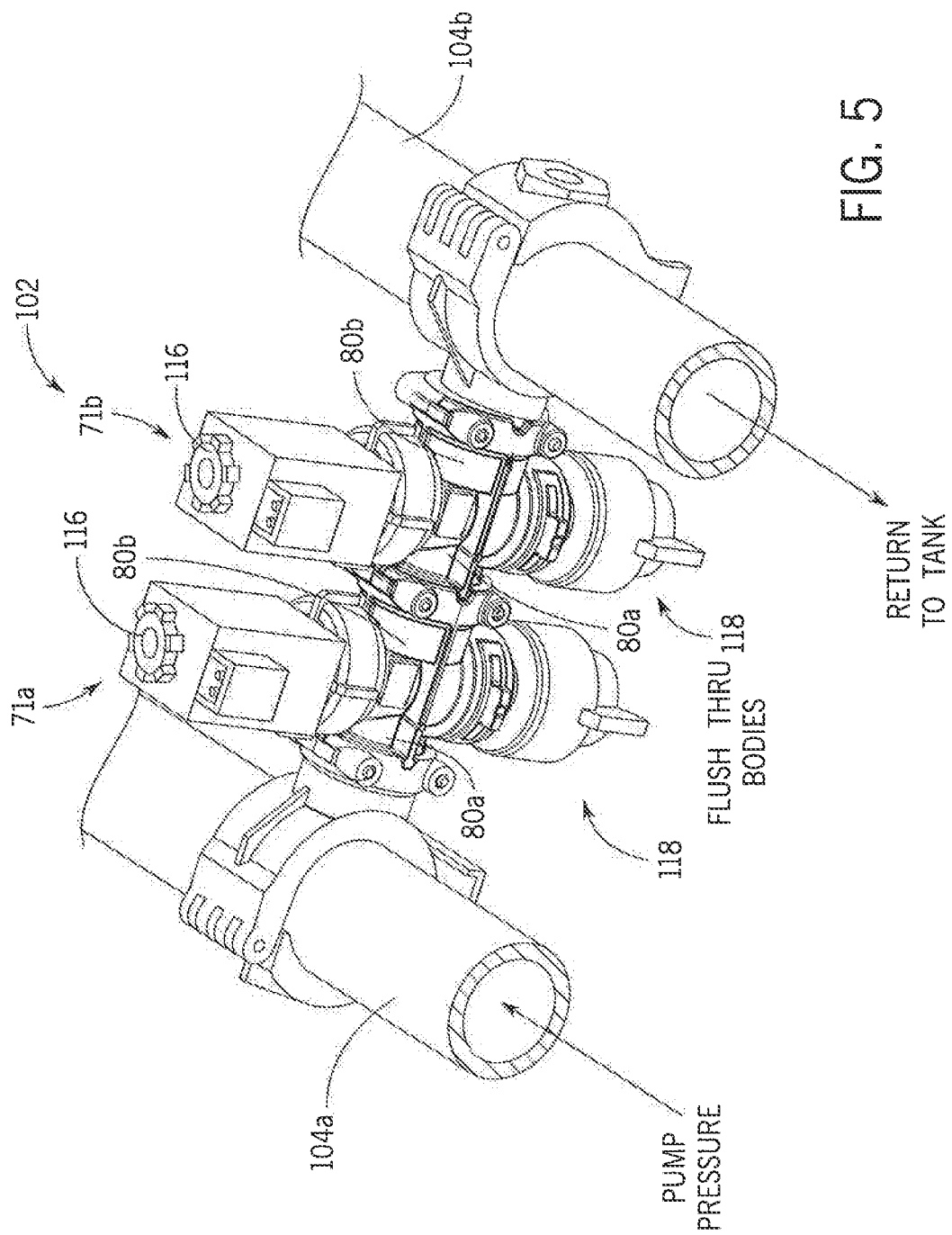
FIG. 5 is an isometric view of the product lines coupled to nozzle assemblies of FIG. 3, implementing a third mode of operation providing flushing through the nozzle assemblies, in accordance with an aspect of the invention.

With additional reference to FIG. 5, in a third mode of operation providing flushing through the nozzle assemblies 71, the control system 114 can control the valving arrangement 106 to connect the first product line 104a to the pump 36 and the pump line 110 to supply liquid product to the nozzle system 102 while connecting the second product line 104b to the tank 55 and the tank line 112 for returning product from the nozzle system 102 to the tank. In addition, the control system 114 can control each nozzle assembly 71 in the nozzle system 102 to cease spraying by closing the orifices 118 of each nozzle assembly 71 via solenoids 116. By pumping liquid product to only the first product line 104a under pressure, while returning the liquid product to the tank 55 in the second product line 104b, and while the orifices 118 are closed, the spray system 35 can flush contents of the tank 55 through the nozzle assemblies 71. In addition, in an alternative mode, reverse flushing can be provided by instead pumping liquid product to only the second product line 104b under pressure, while returning the liquid product to the tank 55 in the first product line 104a, while the orifices 118 are closed.

In other words, the valving arrangement 106 can connect the product lines 104 to the nozzles in different ways to achieve different modes of operation. Such modes can include providing liquid product flow through the nozzle assemblies 71 at differing rates and/or flushing the product through the nozzle assemblies 71 in differing directions. This can be achieved by controlling the valving arrangement 106 to selectively connect any of the product lines 104 to the pump 36 for supplying product, to tank 55 for returning product, or to block any of the lines to inhibit the flow of product in the blocked line. Accordingly, by connecting one line to the pump 36 and the other line to the tank 55, the boom system 70 containing spray nozzle assemblies 71 can be flushed, nozzle bodies and all. Reverse flushing is also possible. Also, blocking a larger product line, such as the second product line 104b, and feeding the spray nozzle assemblies 71 with a smaller line, such as the first product line 104a, can provide proper flow speeds for low rates. Swapping the supply to the larger line can provide proper flow speeds for medium rates. Pressurizing both lines can provide proper flow speeds for high rates. Moreover, by flushing through the nozzles, a majority of blind spots can be eliminated. Flushing is more complete, and air can also be removed.

Figure 6:
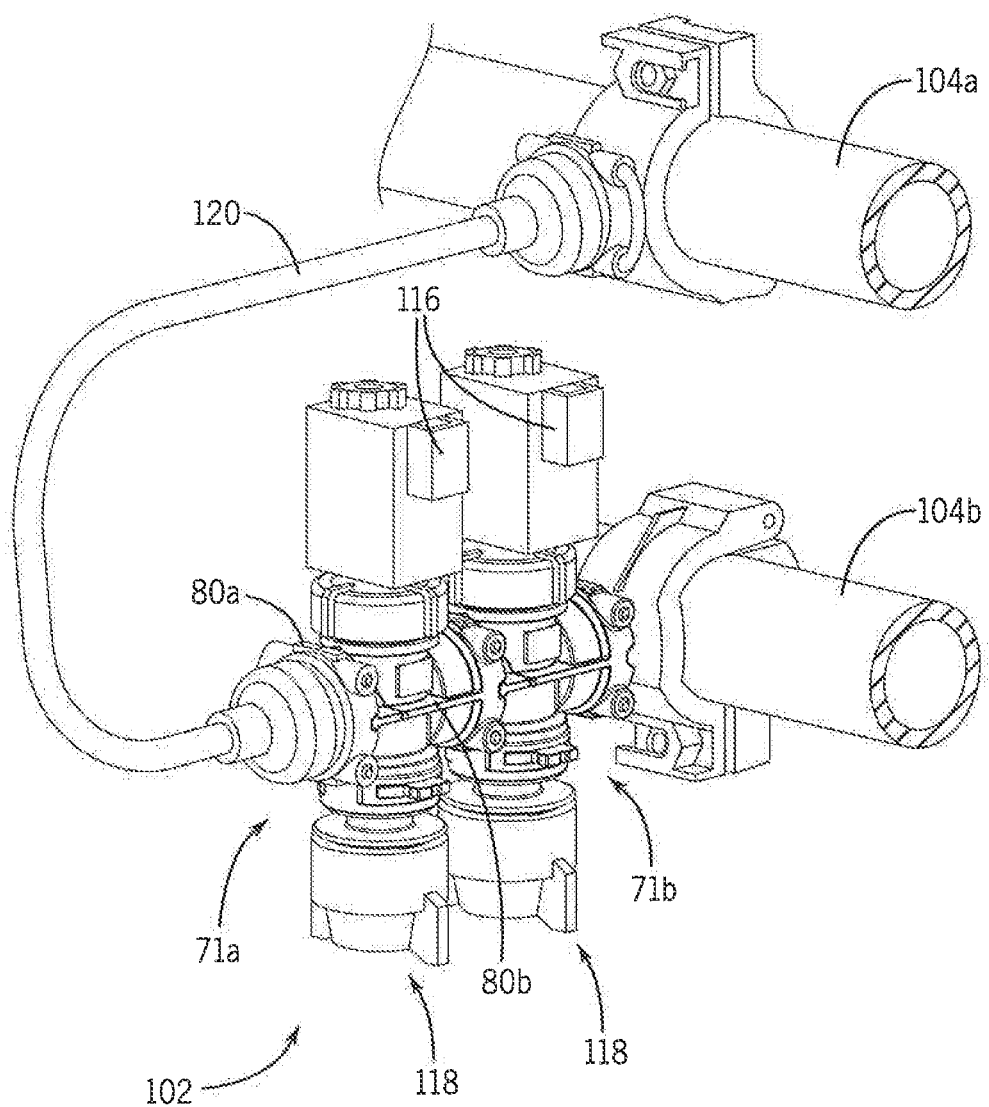
FIG. 6 is an isometric view of product lines coupled to nozzle assemblies in a first alternative arrangement in accordance with an aspect of the invention.

Referring now to FIG. 6, an isometric view of the first and second product lines 104a and 104b, respectively, coupled to nozzle assemblies 71 in a first alternative arrangement, where like numerals refer to like parts throughout, is provided in accordance with an aspect of the invention. Here, one or both of the first and second product lines 104a and 104b, respectively, can be remote mounted to the nozzle assemblies 71. For example, as shown, the first product line 104a is remote mounted to the first nozzle assembly 71a by a branch line 120 connecting to a port 80 of the nozzle assembly 71a. The branch line 120 could be a flexible hose made of nylon. In this way, the first product line 104a can be at an end of the first nozzle assembly 71a.

Figure 7:
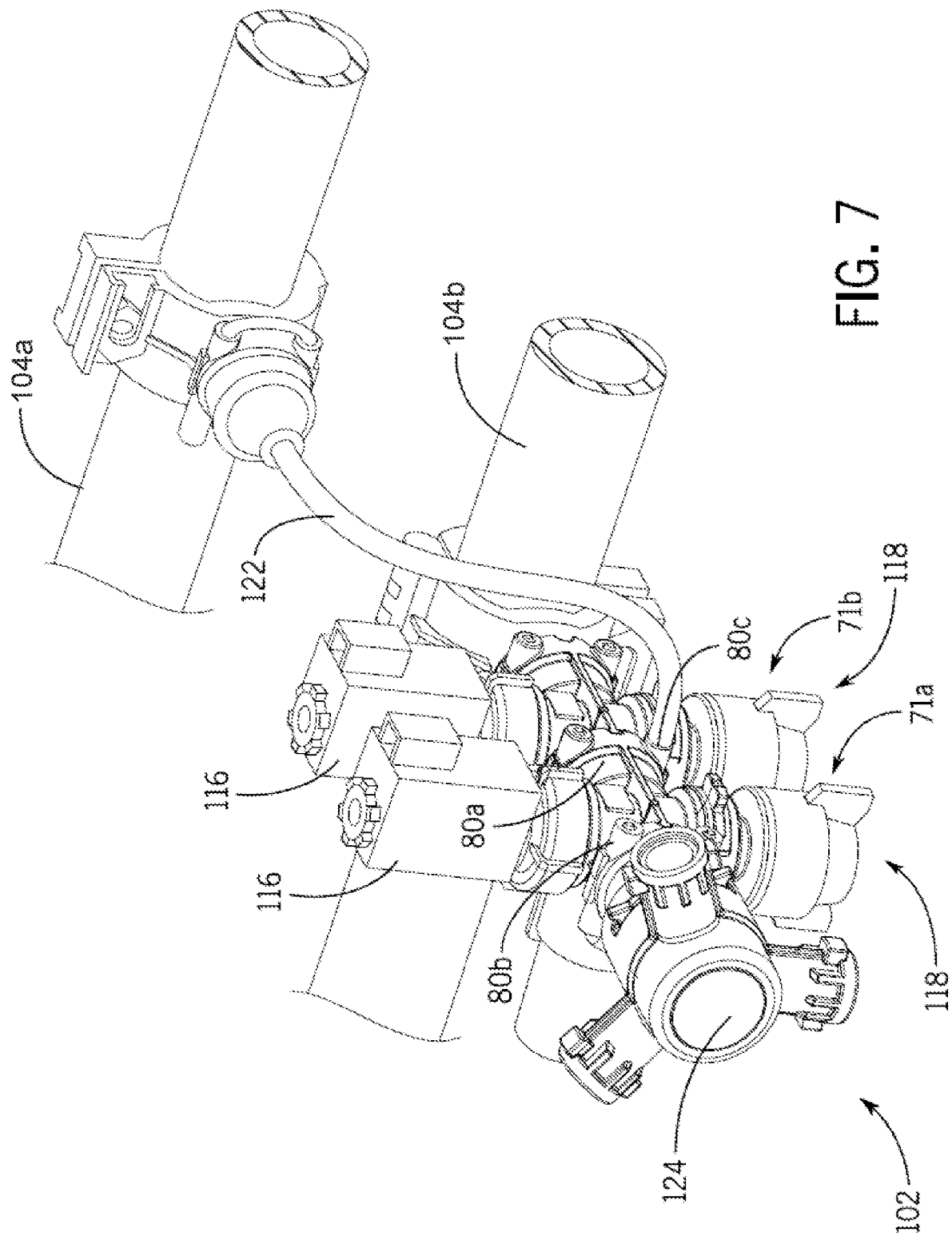
FIG. 7 is an isometric view of product lines coupled to nozzle assemblies in a second alternative arrangement in accordance with an aspect of the invention.

Referring now to FIG. 7, an isometric view of the first and second product lines 104a and 104b, respectively, coupled to nozzle assemblies 71 in a second alternative arrangement, where like numerals refer to like parts throughout, is provided in accordance with an aspect of the invention. Here, one or both of the first and second product lines 104a and 104b, respectively, can be remote mounted to a side of a nozzle assembly 71 through a third port 80c. For example, as shown, the first product line 104a is remote mounted to side of the first nozzle assembly 71a by a branch line 122 connecting to a third port 80c of the first nozzle assembly 71a. This connection can occur simultaneously while the first nozzle assembly 71a is connected to the second nozzle assembly 71b via the first port 80a, and while the first nozzle assembly 71a is connected to a rotatable spray nozzle turret 124 for presenting different orifice sizes, or perhaps another nozzle assembly 71, via the second port 80b. In this way, the first product line 104a can be at a side of the first nozzle assembly 71a, such as to support existing end options in a stack.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray system for an agricultural machine, comprising:
   a nozzle system for spraying a liquid product;
   first and second product lines coupled to the nozzle system; and
   a valving arrangement coupled to the first and second product lines,
   wherein the valving arrangement is configured to selectively connect each of the first and second product lines to supply liquid product to the nozzle system in a first state,
   wherein the valving arrangement is configured to selectively connect one of the first and second product lines to supply liquid product to the nozzle system while blocking the other of the first and second product lines to inhibit flow of liquid product in a second state,
   wherein the valving arrangement is configured to selectively connect one of the first and second product lines to supply liquid product to the nozzle system while connecting the other of the first and second product lines to return liquid product from the nozzle system in a third state, and
   wherein the first and second product lines are of different sizes such that the first and second product lines are configured to supply the liquid product to the nozzle system at different flow rates.

2. The spray system of claim 1, wherein the first product line is no more than ½" in diameter, and wherein the second product line is at least 1" in diameter.

3. The spray system of claim 1, wherein the nozzle system comprises a nozzle assembly having an electronically controlled orifice for spraying the liquid product and first and second ports in communication with the first and second product lines, respectively.

4. The spray system of claim 3, wherein the nozzle assembly is a first nozzle assembly, and further comprising a second nozzle assembly including first and second ports, wherein the first port of the first nozzle assembly is coupled to the first product line, the second port of the first nozzle assembly is coupled to the first port of the second nozzle assembly, and the second port of the second nozzle assembly is coupled to the second product line.

5. The spray system of claim 3, wherein the nozzle assembly comprises a solenoid for opening and closing the orifice.

6. The spray system of claim 1, wherein the valving arrangement comprises first and second electronically controlled multi-way valves connected to the first and second product lines, respectively.

7. The spray system of claim 6, further comprising an electronic control system in communication with the valving arrangement, the electronic control system including a processor executing a program stored in a non-transient medium to control the valving arrangement to selectively switch between the first, second and third states.

8. The spray system of claim 1, wherein the nozzle system includes an electronically controlled orifice for spraying the liquid product, wherein the orifice is controlled to be open in the first and second states, and wherein the (ice is controlled to be closed in the third state.

9. The spray system of claim 1, further comprising a tank for storing liquid product and a pump for conveying liquid product from the tank, wherein the tank is coupled to the valving arrangement in a tank line, and wherein the pump is coupled to the valving arrangement in a pump line.

10. A spray system for an agricultural machine, comprising:
    a nozzle system for spraying a liquid product;
    first and second product lines coupled to the nozzle system;
    a valving arrangement coupled to the first and second product lines; and
    an electronic control system in communication with the valving arrangement, the electronic control system including a processor executing a program stored in a non-transient medium to control the valving arrangement to selectively switch between a plurality of states, including:
    a first state wherein the valving arrangement is configured to selectively connect each of the first and second product lines to supply liquid product to the nozzle system;
    a second state wherein the valving arrangement is configured to selectively connect one of the first and second product lines to supply liquid product to the nozzle system while blocking the other of the first and second product lines to inhibit flow of liquid product; and
    a third state wherein the valving arrangement is configured to selectively connect one of the first and second product lines to supply liquid product to the nozzle system while connecting the other of the first and second product lines to return liquid product from the nozzle system.

11. The spray system of claim 10, wherein the first and second product lines are of different sizes such that the first and second product lines are configured to supply the liquid product to the nozzle system at different flow rates.

12. The spray system of claim 10, wherein the valving arrangement comprises first and second electronically controlled multi-way valves connected to the first and second product lines; respectively.

13. The spray system of claim 10, wherein the nozzle system includes an electronically controlled orifice for spraying the liquid product, wherein the orifice is controlled to be open in the first and second states, and wherein the orifice is controlled to be closed in the third state.

14. The spray system of claim 10, further comprising a tank for storing liquid product and a pump for conveying liquid product from the tank, wherein the tank is coupled to the valving arrangement in a tank line, and wherein the pump is coupled to the valving arrangement in a pump line.

15. A self-propelled agricultural vehicle, comprising:
    a chassis supporting a cab and having a plurality of wheels for moving the vehicle;
    a liquid product application system supported by the chassis, the liquid product application system including a plurality of nozzle assemblies, each nozzle assembly for spraying a liquid product;
    first and second product lines coupled to each nozzle assembly;
    a valving arrangement coupled to the first and second product lines; and
    an electronic control system in communication with the valving arrangement, the electronic control system including a processor executing a program stored in a non-transient medium to control the valving arrangement to selectively switch between a plurality of states, including:

a first state wherein the valving arrangement is configured to selectively connect each of the first and second product lines to supply liquid product to each nozzle assembly;

a second state wherein the valving arrangement is configured to selectively connect one of the first and second product lines to supply liquid product to each nozzle assembly while blocking the other of the first and second product lines to inhibit flow of liquid product; and a third state wherein the valving arrangement is configured to selectively connect one of the first and second product lines to supply liquid product to each nozzle assembly while connecting the other of the first and second product lines to return liquid product from each nozzle assembly.

16. The vehicle of claim 15, wherein the first and second product lines are of different sizes such that the first and second product lines are configured to supply the liquid product to each nozzle assembly at different flow rates.

17. The vehicle of claim 15, wherein the valving arrangement comprises first and second electronically controlled multi-way valves connected to the first and second product lines, respectively.

18. The vehicle of claim 15, wherein each nozzle assembly includes an electronically controlled orifice for spraying the liquid product, wherein the orifice is controlled to be open in the first and second states, and wherein the orifice is controlled to be closed in the third state.

19. The vehicle of claim 15, further comprising a tank for storing liquid product and a pump for conveying liquid product from the tank, wherein the tank is coupled to the valving arrangement in a tank line, and wherein the pump is coupled to the valving arrangement in a pump line.

* * * * *